(12) United States Patent
Vasile et al.

(10) Patent No.: US 11,815,335 B2
(45) Date of Patent: Nov. 14, 2023

(54) GUIDED MUNITION SYSTEMS FOR DETECTING OFF-AXIS TARGETS

(71) Applicant: BAE Systems Information and Electronic Systems Integration Inc., Nashua, NH (US)

(72) Inventors: Joseph D. Vasile, Nashua, NH (US); David J. Schorr, Austin, TX (US); James H. Steenson, Jr., Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 783 days.

(21) Appl. No.: 16/467,243

(22) PCT Filed: Dec. 15, 2016

(86) PCT No.: PCT/US2016/067014
§ 371 (c)(1),
(2) Date: Jun. 6, 2019

(87) PCT Pub. No.: WO2018/111282
PCT Pub. Date: Jun. 21, 2018

(65) Prior Publication Data
US 2020/0080819 A1 Mar. 12, 2020

(51) Int. Cl.
*F41G 7/22* (2006.01)
(52) U.S. Cl.
CPC ........... *F41G 7/226* (2013.01); *F41G 7/2293* (2013.01)

(58) Field of Classification Search
CPC .............................. F41G 7/226; F41G 7/2293
See application file for complete search history.

(56) References Cited

U.S. PATENT DOCUMENTS

| 5,088,659 | A | * | 2/1992 | Neff | ...................... F41G 7/2246 244/3.16 |
| 5,458,041 | A | | 10/1995 | Sun et al. | |
| 5,779,187 | A | * | 7/1998 | Dulat | ...................... G01S 17/66 359/226.1 |

(Continued)

OTHER PUBLICATIONS

EP Search Report, EP 16924085, dated Jul. 10, 2020, 9 pages.
International Search Report, PCT/US16/67014, dated Aug. 16, 2017, 10 pages.

*Primary Examiner* — Marcus E Windrich
(74) *Attorney, Agent, or Firm* — Finch & Maloney PLLC; Gary McFaline

(57) ABSTRACT

Systems are disclosed for navigating a missile to a target using a fixed sensor onboard the missile. In an embodiment, a system includes a launch platform traveling a pre-programmed route to deliver the missile within an area. The missile travels a first flight path through the area in effort to detect targets. If no targets are detected along the first flight path, the missile transitions to a second flight path, different from the first flight path, to locate targets off-axis relative to the first flight path. While the missile travels the second flight path, the sensor receives signal identifying a target located at a position off-axis relative to the first flight path. The missile then adjusts the second flight path to direct the missile to the target. In an example embodiment, the first flight path is straight or arced, while the second flight path is u-shaped, corkscrew-shaped, or spiral-shaped.

18 Claims, 11 Drawing Sheets

(56) References Cited

U.S. PATENT DOCUMENTS

| | | | |
|---|---|---|---|
| 6,626,396 B2* | 9/2003 | Secker | F41G 7/2246 244/3.17 |
| 8,516,938 B2* | 8/2013 | Roemerman | F41F 3/06 89/1.55 |
| 2007/0068373 A1 | 3/2007 | McCantas, Jr. | |
| 2007/0241227 A1 | 10/2007 | Zemany et al. | |
| 2009/0228159 A1* | 9/2009 | Flowers | F41G 7/226 701/3 |
| 2010/0073664 A1 | 3/2010 | Krasutsky | |
| 2010/0198514 A1 | 9/2010 | Miralles | |
| 2011/0147515 A1 | 6/2011 | Miller et al. | |
| 2012/0091253 A1 | 4/2012 | Ierson et al. | |
| 2014/0042265 A1* | 2/2014 | De Picciotto | F41G 7/22 244/3.15 |
| 2020/0256643 A1* | 8/2020 | Schorr | F41G 7/008 |
| 2021/0102790 A1* | 4/2021 | Schorr | F02K 9/97 |
| 2021/0172717 A1* | 6/2021 | Schorr | F42B 10/46 |

* cited by examiner

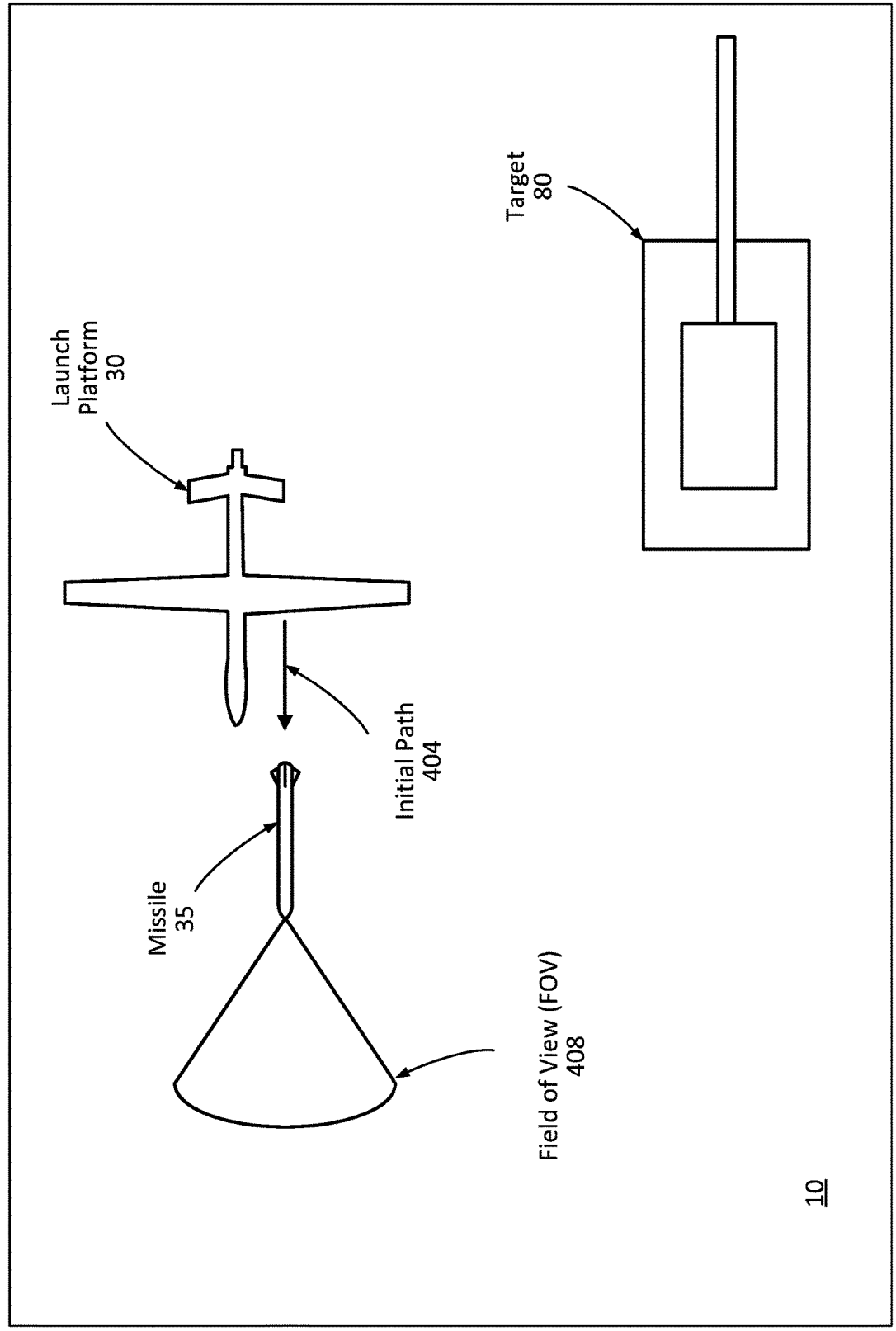

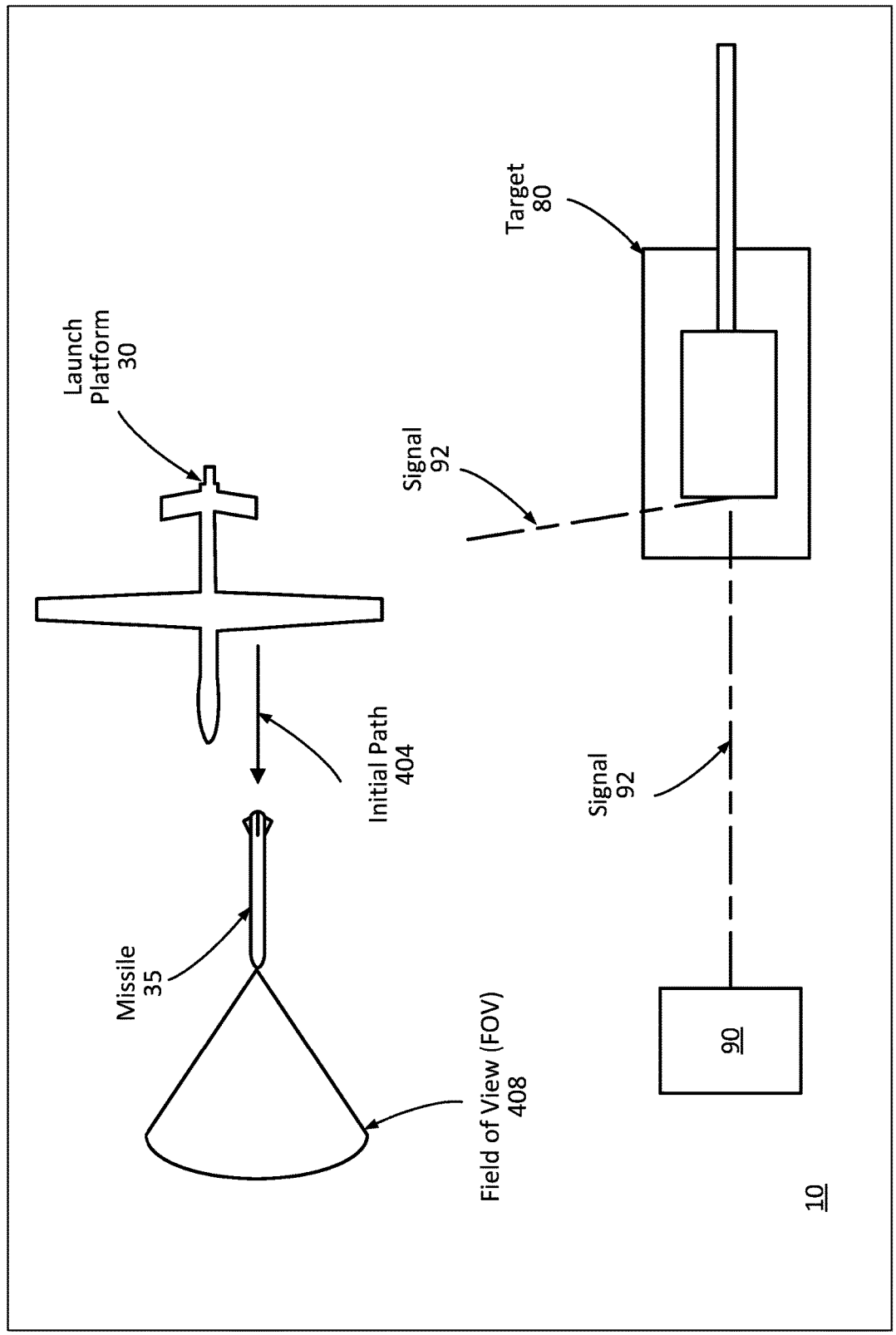

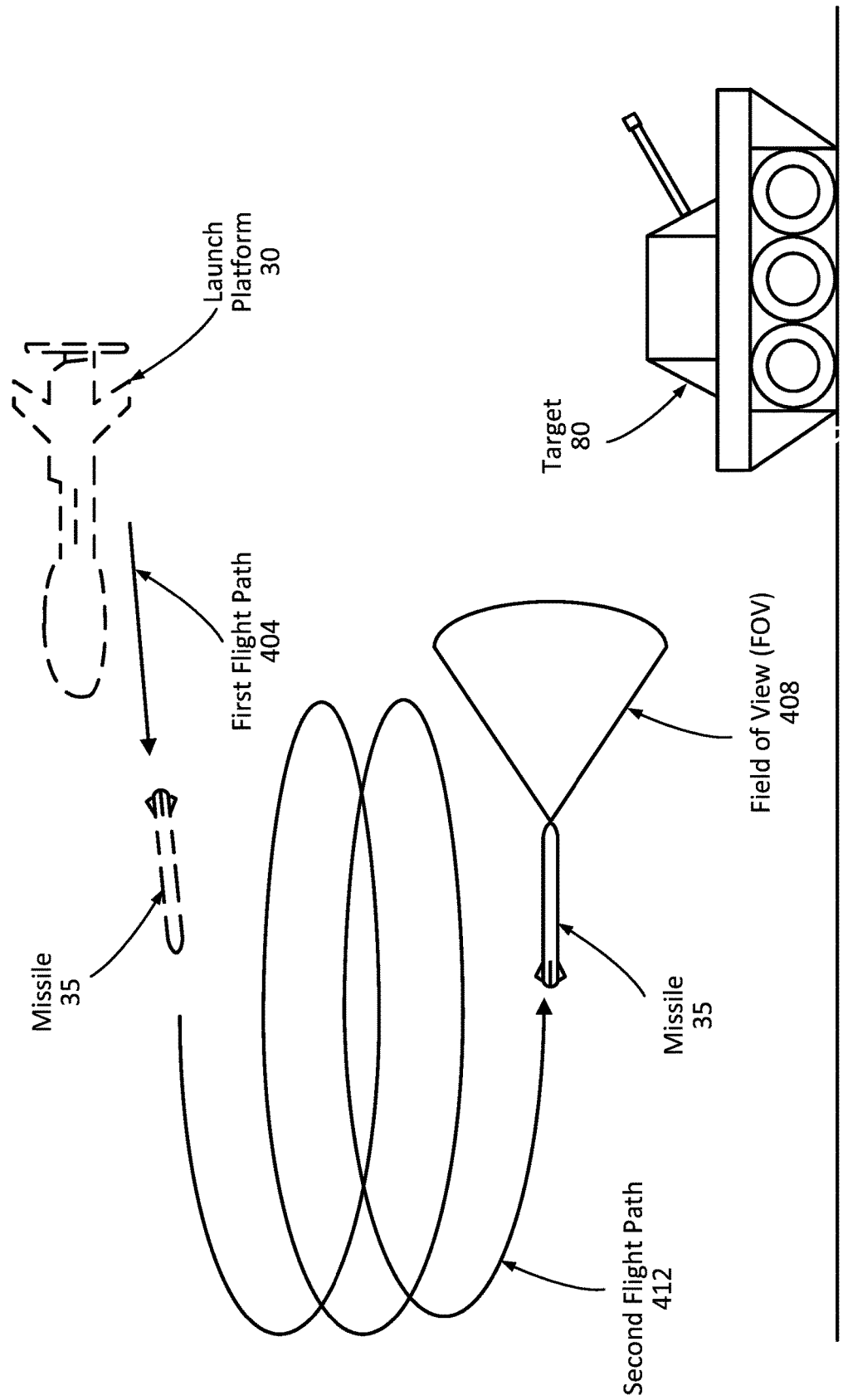

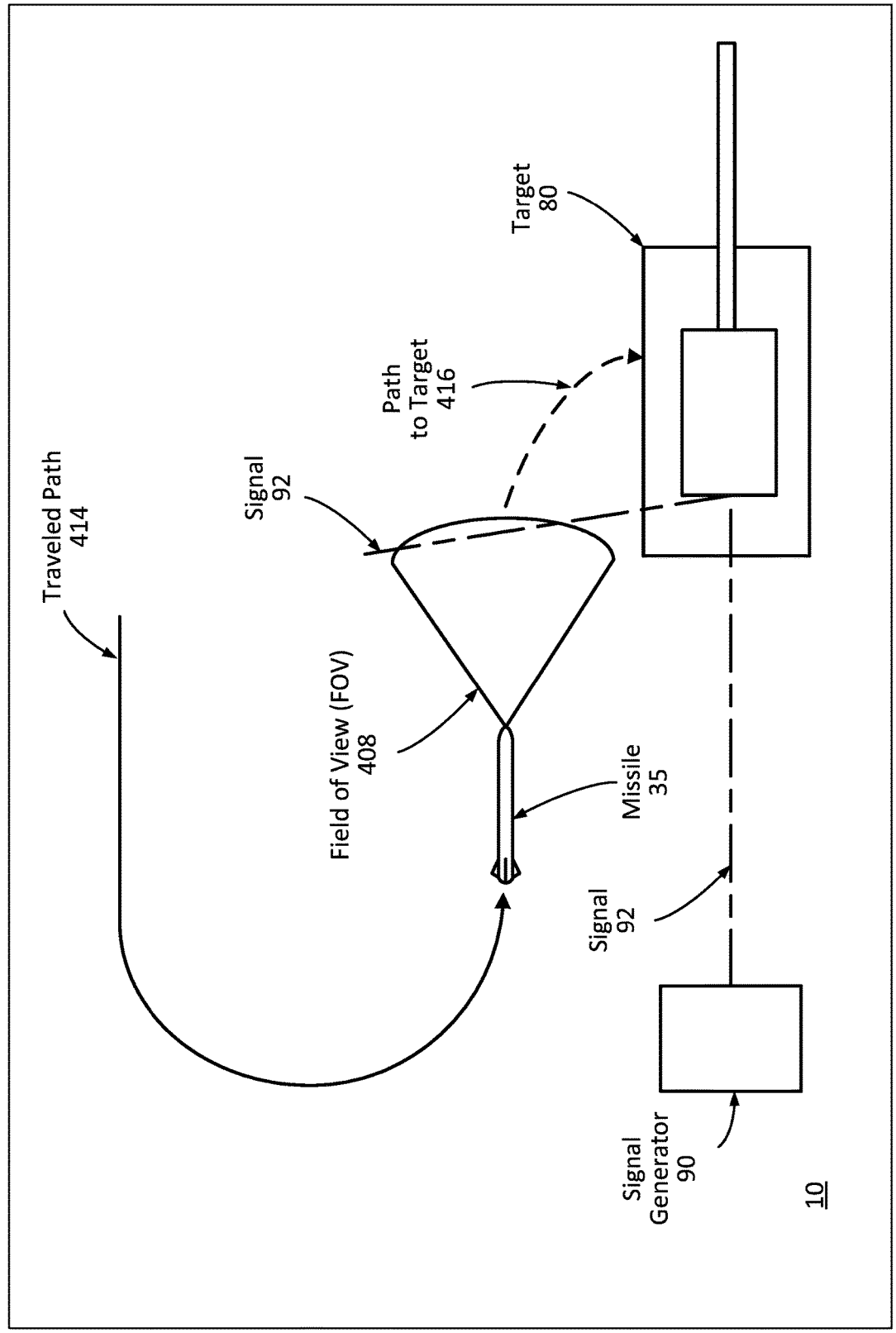

GUIDED MUNITION SYSTEMS FOR DETECTING OFF-AXIS TARGETS

FIELD OF THE DISCLOSURE

This disclosure relates to guided munition systems, and more particularly to guided munition systems for off-axis target acquisition.

BACKGROUND

Target acquisition systems are configured to detect, identify, and locate a target within an area for purposes of deploying munitions, such as a missile or projectile, against the target. Some target acquisition systems, such as radar systems, are further configured to track movements of potential targets. Once identified, target locations can be used by the missile or a launch platform to guide the missile towards an intended target. Target acquisition systems can determine a target location based on an input, such as radio waves or infrared signals, reflected or otherwise received from the target. For target acquisition systems disposed on the missile, the missile is launched or otherwise delivered proximate to the target within the area to receive the input. Once received, the input is used to guide the missile towards the target.

SUMMARY

One example embodiment of the present disclosure provides a guided munition system including a guided munition deliverable to an area by a launch platform traveling along a pre-programmed route to the area, the guided munition configured to initially travel along a first flight path through the area and to transition to a second flight path through the area in response to not identifying an on-axis target when traveling on the first flight path, the second flight path is being different from the first flight path and configured to locate an off-axis target relative to the first flight path; and a sensor onboard the guided munition, the sensor positioned relative to the guided munition and to detect an input signal indicative of the on-axis target as the guided munition moves along the second flight path. In some cases, the guided munition system further includes a signal generator to transmit a signal to illuminate the target, such that the signal is reflected from the target and received by the sensor of the guided munition. In other cases, sensor has a field of view between 30 and 40 degrees. In some other cases, the second flight path is a pre-programmed flight path that guides the guided munition through a substantially u-shaped flight path. In yet other cases, the guided munition includes a switch, the switch to input a signal identifier into the guided munition to identify signals received by the sensor that correspond to the target. In other cases, the second flight path is a pre-programmed flight path that guides the guided munition through a spiral or corkscrew flight path. In some other cases, the guided munition system further includes the launch platform, wherein the launch platform is an autonomous unmanned aerial vehicle, the vehicle to move along a pre-programmed route. In other cases, the guided munition is a missile and the sensor onboard the missile is fixed relative to the missile.

Another example embodiment of the present disclosure provides a method for navigating a missile to a target after the missile has been launched from a launch platform traveling along a pre-programmed route within an area, the method including navigating the missile along a first flight path within the area; in response to determining the target is off-axis relative to the first flight path, navigating the missile along a second flight path different from the first flight path, the second flight path to position a fixed sensor onboard the missile to view off-axis locations, relative to the first flight path; receiving a signal via the fixed sensor while traveling along the second flight path, the signal identifying presence of the target; and adjusting the second flight path to direct the missile to the target within the area based on the received signal. In some instances, the method further includes identifying the target based on the received signal. In some such instances, identifying the target includes comparing a signal identifier of the received signal with target information stored on the missile. In yet other instances, navigating the missile along the second flight path commences in response to the missile traveling a pre-defined distance through the area along the first flight path without target detection. In some such instances, the pre-defined distance is at least two kilometers. In other instances, navigating the missile along the second flight path commences in response to the missile traveling through the area for a pre-defined period of time without target detection. In some such instances, the pre-defined period of time is at least five seconds. In some other instances, navigating the missile along the second flight path commences after a separation criteria is achieved, to allow the launch platform to leave the area prior to commencement of the second flight path.

Another example embodiment of the present disclosure provides a computer readable medium including one or more non-transitory machine readable mediums encoding a plurality of instructions that when executed by one or more processors cause a process to be carried out for navigating a missile to a target within an area, the process including causing navigation of the missile through a first flight path within the area; in response to determining the target is off-axis relative to the first flight path, causing navigation of the missile along a second flight path different from the first flight path, the second flight path to position a fixed sensor onboard the missile to view off-axis locations relative to the first flight path; receiving a signal via the fixed sensor while traveling along the second flight path, the signal identifying presence of the target; and causing adjustment the second flight path to direct the missile to the target within the area based on the received signal. In some cases, the process further includes identifying the target based on the received signal. In other cases, causing navigation of the missile along the second flight path commences in response to the missile traveling through the area along the first flight path for at least one of a pre-defined period of time and a pre-defined distance. In yet some other cases, causing navigation of the missile through the second flight path occurs after separation criteria is achieved, to enable the launch platform to leave the area. In other cases, the second flight path is a pre-programmed flight path that guides the missile through a u-shaped or spiral or corkscrew flight path.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 4A is a top view of an area illustrating a launch of a missile from a platform, in accordance with an embodiment of the present disclosure.

FIG. 4B is a top view of an area illustrating a signal identifying a target in an off-axis position relative to a first path of the missile, in accordance with an embodiment of the present disclosure.

FIG. 4D is a side view of an area illustrating a second flight path for the missile within the area, in accordance with another embodiment of the present disclosure.

FIG. 4E is a top view of an area illustrating a missile acquiring a target upon traveling a second flight path, in accordance with an embodiment of the present disclosure.

Figure 1A:
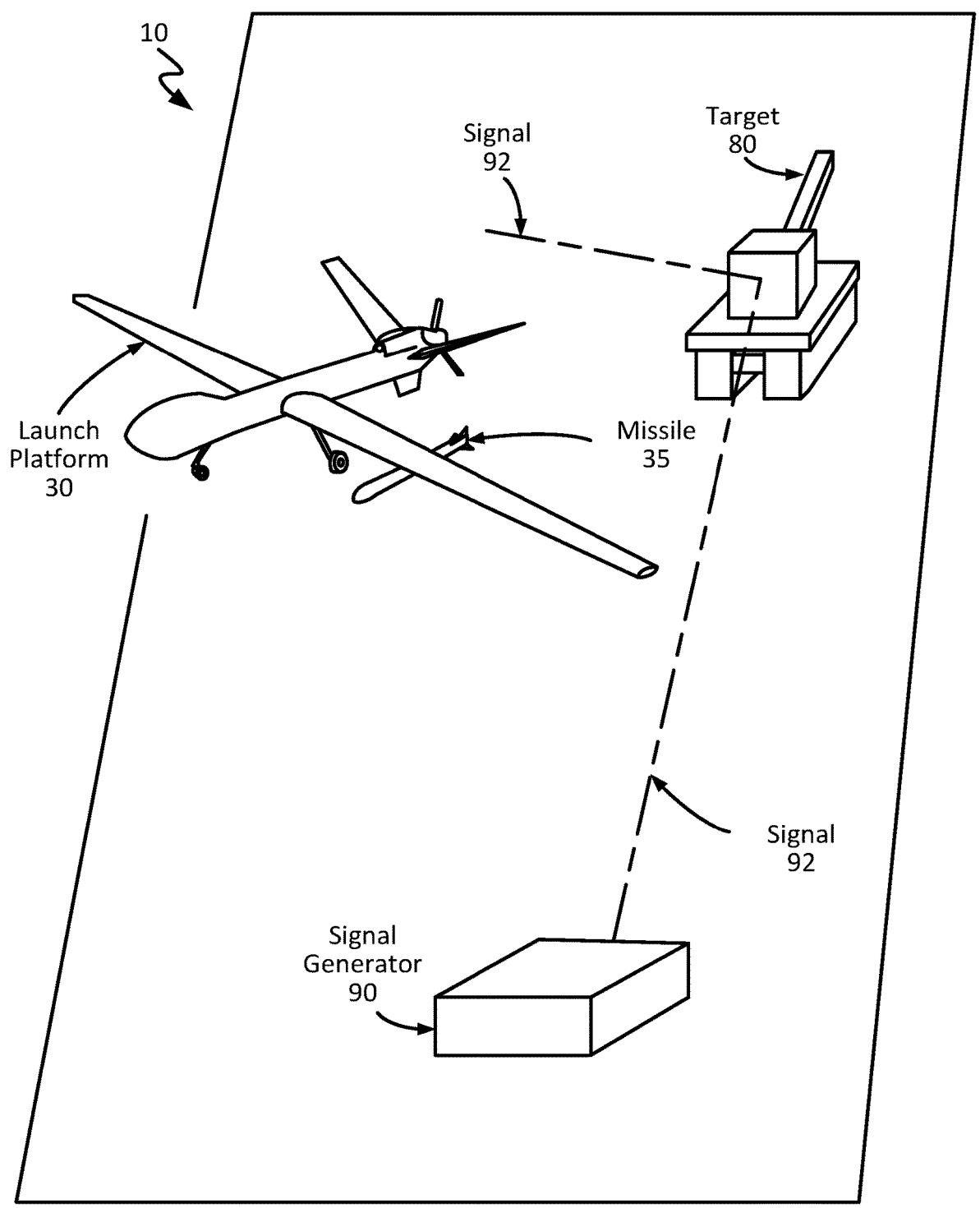
FIG. 1A is a perspective view of an area about a target that includes a launch platform and a signal generator located remotely from the launch platform, in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for guided munition systems configured to navigate a guided munition, such as a missile, unmanned aerial vehicle (UAV), rocket, or other projectile, to a target. The guided munition, for example a guided missile, includes a fixed sensor disposed on the missile and configured to detect a signal identifying a target. The system includes a launch platform configured to travel a pre-programmed route to deliver and launch the missile within an area. After launch, the missile travels a first flight path (e.g., an initial flight path) through the area to detect on-axis targets relative to the missile. An on-axis target is a target located in front of or otherwise "visible" to the missile on the first flight path, such that a signal identifying the target is received or otherwise detected within the field of view (FOV) of the sensor. If no targets are detected on the first flight path, the missile travels a second flight path different from the first flight path to locate off-axis targets relative to the first flight path. An off-axis target is a target located outside the FOV of the sensor when on the missile is on the first flight path, such as when the target is to the side and/or behind the missile relative to the first flight path of the missile or otherwise. According to some embodiments, the second flight path is shaped or otherwise configured to expose the missile sensor to a greater portion of the area in which the target is believed to be located, such as a spiral or corkscrew or u-shape. As a result of the missile moving along the second flight path, the sensor receives a signal identifying a target located at an off-axis position relative to the first flight path. The missile, in response to receiving the signal, adjusts the second flight path to direct the missile to the target using the received signal.

General Overview

A UAV, such as a drone, can effectively perform reconnaissance and surveillance to identify and engage threats located along a route, such as a flight path, to accomplish a mission. In one example these vehicles are launched remotely and guided using onboard computers to execute a pre-programmed route. In some instances, the UAV engages an identified threat using guided munitions, such as guided missiles and rockets. As an example, a guided missile can be delivered by the UAV to a target located along the flight path. For illustrative purposes, the example herein will use missile, but it is understood that any guided munition is considered equivalent. A signal, for example a laser, radio frequency, or radar signal, reflected or otherwise emitted from the target is detected by the missile to accurately guide the missile towards the target. The signal is detected when the signal is within the field of view (FOV) of a sensor disposed on the missile. A target located in front of the missile, such that a signal reflected from the target is received within the FOV of the sensor is an on-axis target. Thus, the position of the on-axis target relative to the missile allows the missile to detect and engage the target. Off-axis targets, such as targets located to the side and/or behind the missile, reflect signals outside the FOV of the sensor, and therefore present challenges for guided munition systems. For instance, missiles having fixed or otherwise non-rotatable sensors require the launch platform to adjust its flight path to position the platform relative to the target, such that the signal identifying the target can be received within the FOV of the missile-based sensor. For self-directed launch platforms, such as autonomous drones, which execute a pre-programmed route, such position adjustments cannot be made and thus off-axis targets cannot be engaged. Missiles with rotatable sensors, such as a sensor mounted to a gimbal, are not cost effective and also limit potential applications for the missile. For instance, rotatable sensors often increase the size and weight of the missile, and thus limit the platforms that can launch the missile. In addition, rotatable sensors are more complex and expensive than fixed sensors due to the number of additional components needed to ensure proper function and accuracy of the sensor.

To this end, techniques and architecture are disclosed for guided munition systems configured to navigate a guided munition, such as a missile, rocket or projectile, to a target. The guided munition, for example a guided missile, includes a fixed onboard sensor that is configured to detect a signal identifying a target. The signal can be, for example, a reflected version of an illumination signal directed to the target, or alternatively, a signal emitting from the target itself. In any such cases, the signal received at the missile-based sensor can be used to engage the target. A fixed sensor is a sensor that does not move relative to the missile (e.g., not a gimbal mounted sensor). In an example embodiment, the fixed sensor is a semi-active laser seeker having an FOV between 30 to 40 degrees. The sensor is configured to detect or otherwise receive within its FOV signals (e.g., laser, radio frequency, or radar signals) reflected or otherwise emanating from a target within the area. In addition, the missile also includes one or more onboard computing systems, such as flight control, guidance, and target acquisition systems, to operate the missile once it is released from the launch platform and guide it towards a target along a flight path. A flight path is an actual or planned course that the missile travels within the area. The flight control and/or guidance systems are configured to generate commands or instructions to operate one or more control surfaces of the missile to adjust the flight path of the missile as needed to stay on line to target. The target acquisition system is configured to identify a target based on a signal received in the FOV of the fixed sensor.

The missile is delivered to the area using a launch platform. The launch platform is configured to travel along a pre-programmed route to deliver and launch the missile within the area. In one example embodiment, the launch platform is an autonomous UAV, such as a drone, that is pre-programmed to travel a specific route to accomplish a desired mission objective. The launch platform, as a result, cannot change or otherwise modify its flight path to engage a target. From a remote location, the launch platform can be launched and subsequently operated to and through the area that includes the target.

Once within the area, the launch platform launches or otherwise delivers the missile to the area. After launch, the missile is configured to travel along a first flight path through the area. The first flight path generally can be any path where a likelihood of detecting the target within the area is possible, and in some embodiments is a straight or arced path through the area. In any case, the missile travels along the first flight path to detect or otherwise identify on-axis targets. As previously explained, an on-axis target is a target located in the missile FOV for a given flight path. The missile is configured to travel along the first flight using onboard computing systems, such as flight control and guidance systems, configured to operate the missile using inputs from onboard sensors, such as accelerometers. Remote communication signals, such as those from launch platforms or communications stations, are not used to control the missile. The missile travels along the first flight path searching for a signal identifying a target within the area. Signals, such as those generated by a signal generator present in the area, are transmitted to the target (also known as illuminating the target) and are reflected into the area about the target, according to some embodiments. In other embodiments, the signals are generated by the target itself, and emanate therefrom. In any case, when the signals indicative of the target are received within the FOV of the sensor, the missile is configured to identify and engage the target. In some such embodiments, the missile is configured to travel the first flight path for a period of time (e.g., three to ten seconds, such as five seconds). In other embodiments, the missile is configured to travel a specified distance (e.g., 1 to 4 kilometers, such as 2 kilometers) with no target detection, prior to performing a second flight path.

The missile is configured to travel through a second flight path different from the first flight path to locate off-axis targets relative to the first flight path. The missile is configured to travel along the second flight path in response to the missile detecting no targets along the first flight path within the given timing or distance based search criteria associated with the first flight path. In an example embodiment, for instance, a second flight path is a pre-programmed flight path through the area that positions the sensor in a different direction relative to the first flight path of the missile. A pre-programmed flight path is a set of instructions and/or commands for controlling the movement of the missile, and is uploaded or stored onboard or otherwise accessible to the missile prior to launching the missile. The second flight path allows the missile to detect off-axis targets relative to the first flight path of the missile. As previously explained, an off-axis target is a target located outside the FOV of the sensor relative to the first flight path. As the missile travels the second flight path, the area within the FOV of the sensor changes, such that the sensor scans or otherwise searches different portions of the area to identify targets off-axis relative to the first flight path. The second flight path, in some embodiments, is a u-shaped or corkscrew or spiral flight path. While moving along the second flight path, the missile can descend at a constant or variable rate depending on the mission parameters (e.g., size of area of interest, initial missile altitude and size, and shape signature of intended target).

In response to receiving the target signal along the second flight path, the missile adjusts the second flight path to direct the missile to the target using the received signal. In an example embodiment, the missile is configured to adjust the second flight path to maintain the received signal within the FOV of the sensor. Using the received signal, the guidance and flight control systems of the missile are configured to generate and/or transmit instructions and commands to operate the control surfaces of the missile to guide the missile towards the target. The missile continues to adjust its flight path to maintain the signal within the FOV of the sensor until the missile impacts or otherwise engages the target.

Example Off-Axis Target Acquisition Application

FIG. 1A is a perspective view of an area 10 about a target 80, the area generally including a launch platform 30 and a signal generator 90, in accordance with an embodiment of the present disclosure. An area 10 is the terrain and air space about a target (e.g., within an immediate vicinity of the target) where a munition, such as a guided rocket or missile can be deployed to engage the target. In some embodiments, the area 10 may include variations in terrain (e.g., rivers, streams, hills or mountains) and/or buildings that contain or otherwise protect the target. In an example embodiment, the area 10 is a 20 square-mile area that includes the location of the target 80. The area 10 can be adjusted or otherwise modified to allow the munition to engage the target 80, as further described herein. As can be further seen, a signal 92 is provided from the signal generator 90 to the target 80 (to illuminate the target), and a reflected version of that illumination signal 92 is further provided from target 80 into the area 10 in which the missile 35 is searching.

Launch platform 30 transports a missile 35 and delivers the missile 35 to the area 10 about the target 80. In an example embodiment, the launch platform 30 is an instrumented measurement vehicle, such as an autonomous UAV, that includes onboard computing systems and sensors configured to execute a pre-programmed route to accomplish a mission objective. A UAV is an aircraft, such as a drone, configured to navigate without a human pilot onboard. An autonomous UAV is a UAV that includes a flight computer that controls avionics to operate the vehicle along a pre-programmed route and need not be remotely controlled using communication signals from a launch platform and/or communication station. A pre-programmed route is a flight path that is provided or otherwise programmed into the platform 30 using firmware or software, according to some embodiments. Once launched, the platform 30 typically does not deviate from its pre-programmed route, for instance to engage an off-axis target as described further herein. The launch platform 30 may include sensors, such as, for example, gyroscopes and accelerometers, configured to provide measurements in any one of the following directions relative to the platform 30 (e.g., a central axis or midpoint of the platform): up-down, side-to-side, forwards-backwards, yaw, roll and pitch. The sensor measurements, in turn, can be used to determine orientation of the platform 30. Such information can further facilitate hand-off of control from the platform to the missile at time of missile launch.

To accomplish a desired mission objective, the launch platform 30 is configured to launch a missile 35 within the area 10. Mission objectives for a launch platform 30 may include reconnaissance and surveillance to identify and engage threats (e.g., target 80) located along a pre-programmed route within the area 10. The launch platform 30 is configured to engage an identified target by launching a guided munition, such as guided missile 35 (hereinafter referred to as missile 35) to destroy the target. A guided munition is a weapon, such as a missile, UAV, rocket or projectile, configured to precisely engage a specific target. In an example embodiment, the missile 35 includes a fixed sensor, such as a semi-active laser seeker, photodetector or thermal image sensor (e.g., cooled or uncooled thermal imaging sensors), configured to detect or otherwise receive a signal from a target (e.g., reflected off the target) and, as described further herein. In response to receiving the signal, the missile 35 is configured to process the received signal to identify the target 80 and guide the missile 35 to the target 80. The missile 35 can be any guided missile, rocket or projectile that can be deployed using the launch platform 30. The munition, in some other embodiments, is the launch platform 30, such as a UAV, rather than a missile. In such embodiments, the launch platform 30 carries a payload and is configured to engage a target 80 by operating the UAV into or otherwise sufficiently proximate to the target 80.

Within the area 10 is a target 80. The target 80 can be any physical object or person identified by the missile 35 as a recognizable threat based on a received signal, as described further herein. The target 80, in some instances, is a fixed target such as a building or temporary structure. In other instances, the target 80 is a mobile target, such as a tank shown in FIG. 1A. No matter its type, the target 80 is identified using a signal 92 that can be received by a sensor on the missile 35, and in turn the missile 35 is configured to engage the target 80 within the area 10 using the received signal 92.

The missile 35 is configured to identify the target 80 using a signal 92 created from a signal generator 90 located within the area 10. For instance, the missile 35 can include a guidance system configured to direct the missile 35 towards the target 80 using the signal 92. The signal 92 can be any communications or data signal, such as a radio, radar and laser signal, capable of transmitting target information. Target information is information that can be used to determine position, distance, speed, and altitude of target within an area and/or relative to the missile 35. In an example embodiment, the signal generator 90 is a target designator configured to generate and transmits the signal 92 to the target 80 to illuminate the target 80 for purposes of target detection. As can be seen, the signal generator 90 can be located within the area 10 about the target 80. The signal generator 90, in some other embodiments, can be carried onboard the launch platform 30. In turn, the signal 92 is reflected from the target 80, and transmitted into the area 10 about the target 80 where the signal 92 can be received by a sensor disposed on the missile 35. The reflected signal 92 is detected when the signal 92 is within the field of view (FOV) of a sensor on the missile 35. Once received, the reflected signal 92 is processed and used to navigate the missile 35 to the target 80.

Figure 1B:
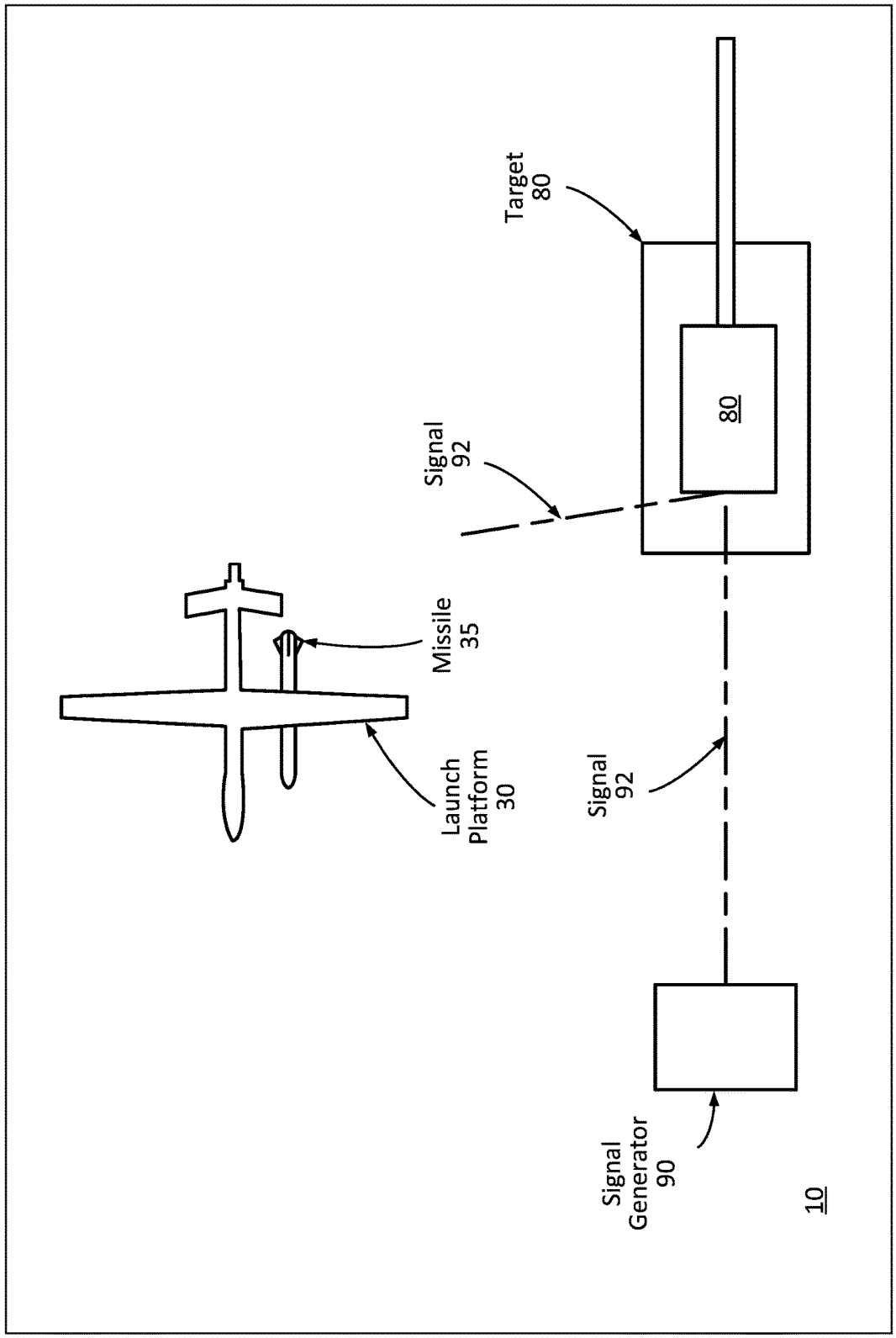
FIG. 1B is a top view of an area about a target that includes a launch platform and a signal generator, in accordance with an embodiment of the present disclosure.

FIG. 1B is a top view of the area 10 about the target 80 that includes a launch platform 30 and a signal generator 90, in accordance with an embodiment of the present disclosure. When the launch platform 30 enters the area 10, the target 80 may be located in one of several locations relative to the launch platform 30. For instance, when the target 80 is located directly in front of the launch platform 30 and thus in front of the missile 35, then the target is an on-axis target, as previously described. Identifying an on-axis target, however, is unlikely in most instances because the target 80 is rarely located along the pre-programmed route of the launch platform 30 such that a signal identifying the target 80 is within the FOV of the sensor disposed on the missile 35. More often, the target 80 is not located in front of the launch platform 30, and thus the target 80 is outside the FOV of the sensor and is an off-axis target. This is illustrated in FIG. 1B, in which the launch platform 30 is positioned within the area 10 such that the target 80 is located behind and to the side of the platform 30. As can be seen, the signal 92 transmitted by the signal generator 90 is reflected off of the target 80 and projected behind the platform 30 and missile 35. Thus, the fixed sensor disposed on missile 35 is not positioned to receive the signal 92. Therefore, in order for the missile 35 to engage the target 80 without requiring the platform 30 to deviate from its pre-programmed route, the missile 35 is configured to seek out the target 80.

System Architecture and Operation

Figure 2A:
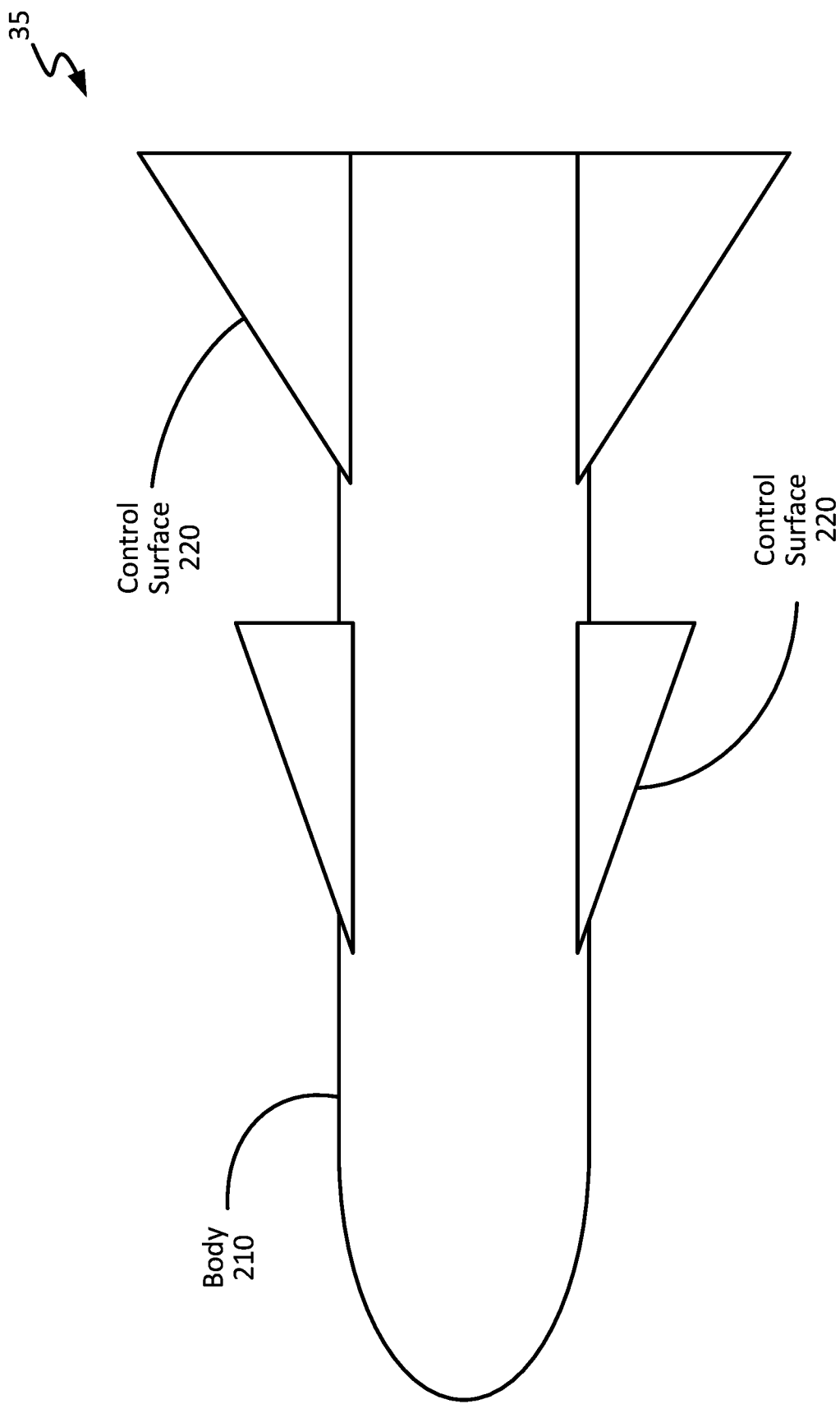
FIG. 2A is a side view of a missile in accordance with an embodiment of the present disclosure.

FIG. 2A is a side view of a missile 35 in accordance with an embodiment of the present disclosure. Munitions, such as guided missiles, rockets and projectiles, are used to engage and destroy potential threats within an area. As can be seen, the missile 35 includes a body 210 and control surfaces 220. The body 210 is configured to house internal components for operating the missile 35 and provide an aerodynamic shape to allow the missile to travel along a flight path.

Attached to the body 210 are control surfaces 220. A control surface 220 is moveable surface, such as an airfoil, rudder, fin, wing, elevator, and aileron, which is configured to control or otherwise guide the missile 35 towards a target and/or along a missile trajectory. The missile 35 can have any number of control surfaces 220 positioned along body 210 depending on the application of the missile 35. In an example embodiment, the missile 35 has tail fins located at the rear and wings located near the center of the body 210. Numerous other configurations will be apparent in light of the present disclosure.

Figure 2B:
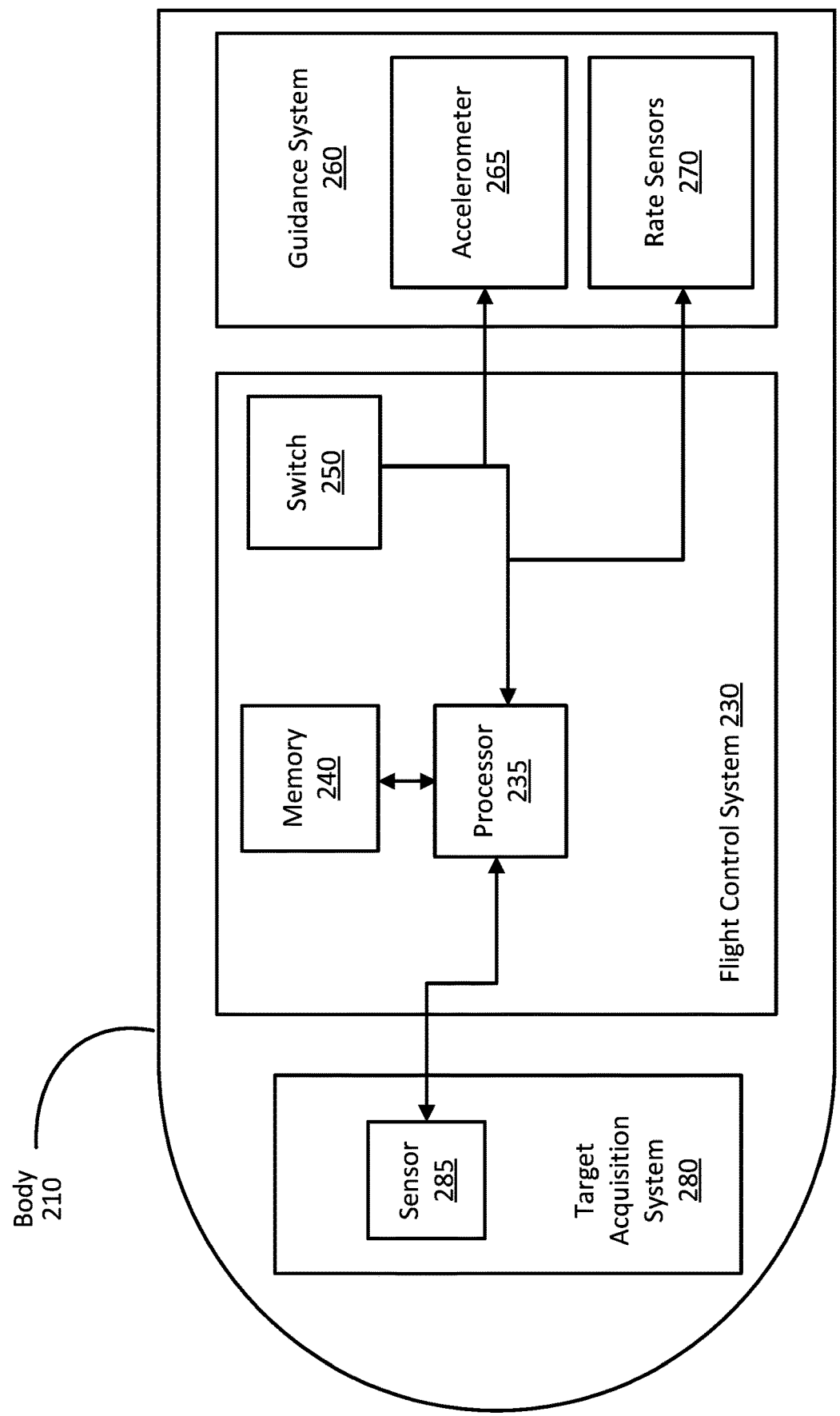
FIG. 2B is a block diagram of a missile configured in accordance with an embodiment of the present disclosure.

FIG. 2B is a block diagram of a missile 35 configured in accordance with an embodiment of the present disclosure. Within the body 210 of the missile 35 are flight control system 230, guidance system 260, and target acquisition system 280. In an example embodiment, the flight control system 230 is configured to control the movement of the missile 35 along a pre-programmed flight path to navigate the missile towards a target. The flight control system 230 includes a processor 235, a memory 240, and a switch 250.

Processor 235 is programmed or otherwise configured to compile and distribute instructions and data. For example, in some embodiments, the processor 235 is configured to execute a pre-programmed flight path for the missile 35 using signals from one or more sensors of the guidance system. Received signals from external sources (e.g., a target) are analyzed by the processor 235 to adjust the flight path of the missile to engage a target. To adjust the flight path of the missile, the processor 235 is configured to determine an orientation of the missile (e.g., determine whether the missile is up-side down) relative to a surface (e.g., the ground) of the area about the target. Missile orientation can be determined in a number of ways using sensors, such as magnetometers, rate sensors, and accelerometers, to measure magnetic and/or gravitational forces acting on the missile. Other methods, such as image horizon detection, can also be implemented by the processor 235 to determine missile orientation. Processor 235 initiates changes or adjustments to the flight path of the missile 35 by generating and transmitting instructions and/or commands to control mechanisms, such as electro-mechanical actuators, to operate the control surfaces 220 of the missile 35. The instructions and/or commands generated by the processor 235 can be executed using firmware and/or software, such as routines and sub-routines, which analyze sensor inputs and determine adjustments for missile control surfaces 220. The processor 235 is configured to transfer the flight path data (e.g., instructions and/or commands) to a memory 240, where such data can be maintained for future use by the system (e.g., further flight path adjustments).

As can be seen, a memory 240 is in communication with and/or otherwise accessible by the processor 235. In an example embodiment, the data created and/or managed by the processor 235 is stored within a memory 240 to support various operations of the missile 35. Data such as images, maps, sensor measurements, signal identifiers, and look-up tables are made accessible to the processor 235 via the memory 240 to determine a flight path for the missile 35. Memory 240 can be of any suitable type (e.g., RAM and/or ROM, or other suitable memory) and size, and in some cases may be implemented with volatile memory, non-volatile memory, or a combination thereof. Memory 240 may also be any physical device capable of non-transitory data storage, such as a computer program product that includes one or more non-transitory machine readable mediums encoding a plurality of instructions that when executed by one or more processors facilitate operation of an electronic device according to a process.

The switch 250 is connected to or otherwise in communication with the processor 235 and configured to program data into the flight control system 230. In an example embodiment, the switch 250 is part of a switch group, such as Laser code Switch Assembly (LSA) switch group. The LSA switch group is used to manually configure the missile to acquire laser signals of the selected laser code. In some embodiments, the switch 250 is a toggle or rotary switch configured to enter a signal identifier. A signal identifier is a unique designator used by the processor 235 to identify a signal from a target. The processor 235 is configured to compare a signal identifier of a received signal with a signal identifier based on the setting of switch 250 to determine whether the received signal corresponds to a target.

The flight control system 230 is operatively coupled to or otherwise in communication with guidance system 260. Guidance system 260 is configured to navigate the missile 35 along its flight path. In an example embodiment, the guidance system 260 is a semi-active guidance system. A semi-active guidance system receives signals (e.g., signals identifying a target) to guide the missile to the target rather than generating a signal, as is done by active guidance systems. Signals generated by other devices, such as a signal generator can be transmitted towards the target (also known as illuminating the target), and in turn are reflected or otherwise transmitted from the target into the space about the target. As a result, the missile 35 traveling within the area can detect or otherwise receive the reflected signal and then proceed to engage the target.

In an example embodiment, the guidance system 260 is an inertial navigation system. An inertial guidance system is a computing system that includes firmware and/or software and sensors (e.g., accelerometers 265, rotational sensors 270, and rate sensors 275) configured to determine an orientation and velocity of the missile. Accelerometer 265 is configured to measure acceleration of the missile. Rate sensors 270, such as a gyroscope or yaw-rate sensor, are configured to measure angular rate of change of missile movement relative to an axis of the missile. The inertial navigation system can determine position, orientation, and velocity of the missile without the use of external navigation references (e.g., communication signals from a remote tracking station). In some other embodiments, the inertial guidance system is configured to determine a missile position within the area based on a previous position estimate of the missile within the area.

The guidance system 260 can operate in one of several modes to guide the missile through the area and/or to an identified target located within the area. In an example embodiment, the guidance system 260 navigates the missile 35 using the following operational modes: (1) roll rate of control, (2) roll attitude control and pitch and yaw rate/attitude control, (3) signal acquired and pursuit guidance, (4) sustain FOV saver, and (5) proportional navigation to target intercept. After launch, the missile can be initially operated in roll rate control mode to stabilize the missile, such that a desired missile orientation can be maintained (to prevent the missile from rolling to an up-side-down orientation). Once stabilized, the missile 35 is configured to operate in roll attitude control and pitch and yaw rate/attitude control mode to navigate the missile 35 through the area. Upon acquiring a signal, the missile 35 is configured to operate in signal acquired and pursuit guidance mode to adjust the trajectory of the missile 35 towards the detected target. To ensure that the missile 35 engages the target, the missile 35 is configure to operate in the sustain FOV saver and proportional navigation to target intercept modes.

As can be seen, the flight control system 230 also interfaces with a target acquisition system 280. Target acquisition system 280 is a system configured to detect, identify and locate a target with sufficient accuracy, such that the missile 35 can effectively engage the target. The target acquisition system 280 includes a sensor 285. In an example embodiment, the sensor 285 is a semi-active laser seeker, such as distributed aperture semi-active laser seeker. Sensor 285, in other embodiments, may be a photodetector, radar detector, thermal image, and/or video sensor. Sensor 285, unlike gimbal mounted sensors, is a fixed or otherwise non-rotatable sensor, such that sensor 285 that does not move relative to the missile 35. The sensor 285 can be positioned at or near the front of the missile 35, and configured to detect a signal (e.g. visible and invisible light, thermal energy, or radio frequency waves) from a target. A signal is detected when the signal enters a FOV of the sensor 285. The FOV of the sensor 285 can be any size capable of providing a sufficient range for detecting a signal from the target, such as between 30 and 40 degrees.

Example Method for Locating an Off-Axis Target

Figure 3:
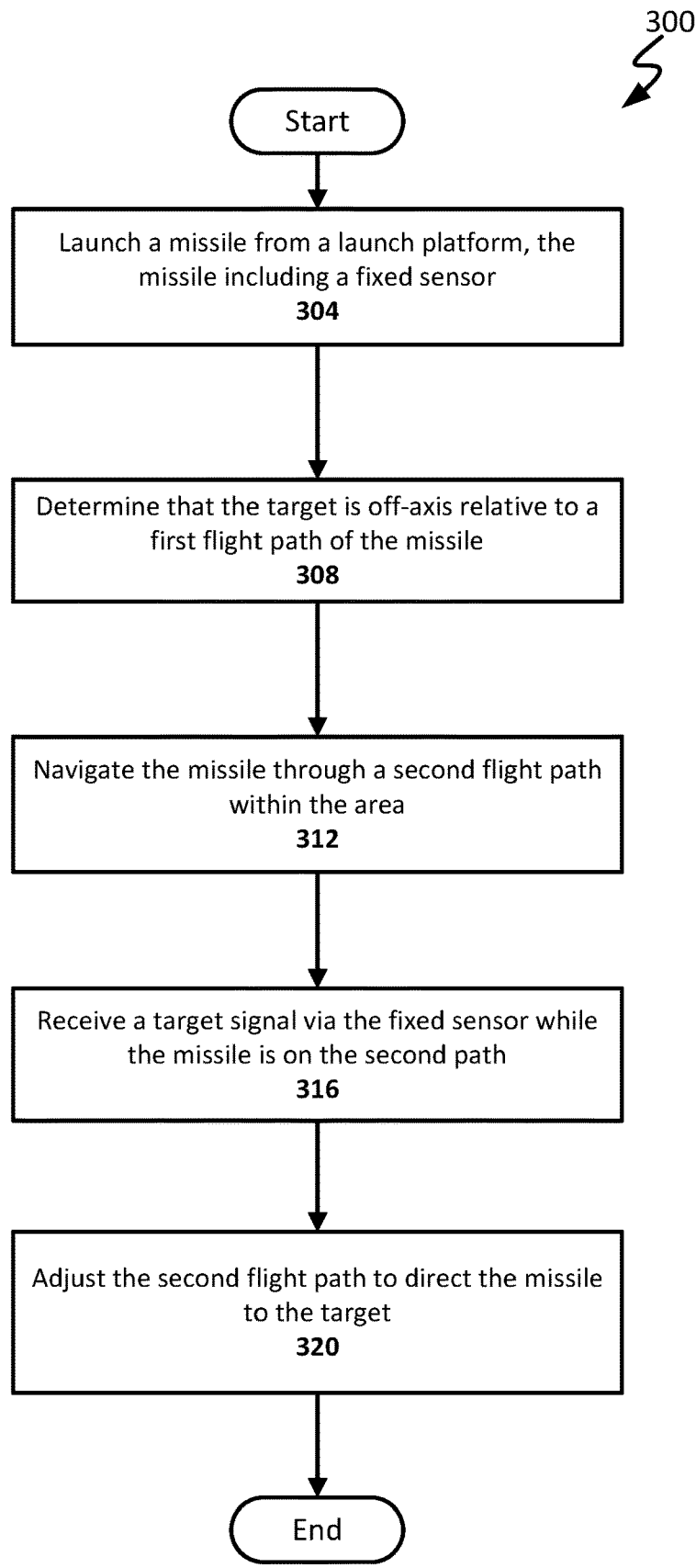
FIG. 3 is a flow chart of an example method for navigating a missile to a target, in accordance with embodiment of the present disclosure.

FIG. 3 is a flow chart of an example method 300 for navigating a missile to a target after the missile has been launched from a launch platform traveling along a pre-programmed route within an area, in accordance with an embodiment of the present disclosure. The method 300 includes launching 304 a missile from a launch platform, the missile including a fixed sensor. In an example embodiment, the launch platform is an autonomous UAV, such as drone, that is programmed to travel to an area and launch a missile within the area to engage a target. This is illustrated in FIG.

4A, in which the launch platform 30 transports a missile 35 to an area 10 along a pre-programmed route. The missile 35 is launched from the launch platform 30 at a distance above the area 10. Once launched, the missile 35 travels along a first flight path 404 within the area 10 to identify a target 80 within the area 10. The target 80 is identified when a signal reflected from the target 80 is received within a FOV of a fixed sensor disposed on the missile 35.

The method 300 further includes determining 308 that the target is off-axis relative to the first flight path. In an example embodiment, the missile is configured to determine that no targets are located at an on-axis position relative to a first flight path of the missile in response to receiving no signals that identify a target within the FOV of the sensor disposed on the missile. This is shown in FIG. 4B, in which the missile 35 moves along the first flight path 404 to acquire or otherwise identify targets located in the FOV 408 of the sensor on the missile 35 (e.g., on-axis targets located in front of the missile 35). As can be seen, the target 80 is located outside the FOV 408 of the sensor. As a result, the signal 92 transmitted by the signal generator 90 and reflected from the target 80 is located outside the FOV 408 of the sensor. The signal 92, thus, is not received by the sensor on the missile 35. In response, the missile 35 is configured to determine that no targets are located in an on-axis position relative to the first flight path 404 of the missile 35. In response, the missile 35 determines that the target 80 is at an off-axis position relative to first flight path 404 of the missile 35.

In some instances, the area about the target may include signals not associated with a target, such as communication signals, which can be received by the sensor on the missile. To distinguish between signals identifying a target and non-target signals, the missile is configured to analyze each signal received by the sensor using a signal identifier. A signal identifier is a unique designator (e.g., a signal frequency) used by a processor to identify a signal from a target. The signal identifier is programmed or otherwise entered into the missile using one or more switches located on the missile, as previously described herein. As the missile travels along the first flight path, the missile is configured to analyze any received signals to determine whether the signal corresponds to an on-axis target. If none of the received signals indicate an on-axis target, then the missile is configured to search for targets located at an off-axis position relative to the first flight path of the missile.

The method 300 further includes navigating 312 the missile through a second flight path different from the first flight path within the area. The second flight path positions the fixed sensor disposed on the missile at a different location within the area. As result, objects within the FOV of the sensor change in response to the missile traveling along the second flight path. Thus, the missile can identify and engage off-axis targets relative to a first flight path (e.g., an initial flight path). This illustrated in an example embodiment of FIGS. 4C and 4D, in which the second flight path 412 is a u-shaped or corkscrew or spiral flight path. In some such embodiments, the second flight path is vertically descending while simultaneously and effectively exposing the fixed sensor of missile 35 to a 360 degree view of area 10. Thus, assuming the fixed sensor is in the forward nose area of the missile 35, the missile 35 can effectively "see" most or all of area 10 as missile 35 travels one or more substantially complete revolutions of the u-shaped, spiral-shaped, or corkscrew-shaped secondary flight path. Note the launch platform 30 has left the area 10 (this is illustrated by the platform shown with hidden lines) and thus, the missile 35 may freely navigate the space about the area 10 to carry out the second flight path 412. The beginning of the second flight path 412 is indicated by the missile 35 shown in hidden lines. As the missile 35 moves along the second flight path 412, the sensor disposed on the missile 35 can detect signals from targets located in various portions of the area 10. To carry out the second flight path 412, the flight control system is configured to actuate or otherwise operate one or more control surfaces (e.g., wings, airfoils, and rubbers) of the missile to adjust the flight path of the missile.

The second flight path can be optimized based on several factors of the missile. Size of the missile, for instance, can be considered when determining the second flight path. A large missile, for example, may move through a large portion of the area (e.g. in a large circular pattern) to position the sensor disposed on the missile in a different location within the area. Smaller missiles with flight paths of reduced scope, however, may move through the missile through a smaller portion of the area. Other factors, such as shape, velocity and maneuverability of the missile and sensor type and FOV, can also be used to determine a second flight path of the missile.

The second flight path can also guide the missile through the area at a constant or variable rate of descent from a given altitude above the area. The missile, in some embodiments, is configured to descend at a constant rate (e.g., 500 feet per second) along the second flight path. In other embodiments, however, the rate of descent may not be uniform throughout the second flight path. The second flight path, for example, may move the missile at a low rate of decent through the area, such that the missile gradually experiences changes in altitude. A low rate of descent allows the missile additional time to search the area to find a target. As the missile approaches a surface (e.g., the ground) of the area, however, the missile may descend more rapidly to avoid being seen by missile detection systems and/or anti-aircraft technology.

The missile, in some embodiments, is configured to achieve separation criteria before the missile begins a second flight path. Separation criteria can be any action or process that allows the launch platform to leave the area before the missile moves through a second flight path. A time delay, for instance, can be used as separation criteria, such that the missile begins the second flight path after a period of time, such as 30 seconds, has elapsed after missile launch. Other separation criteria may include distance (e.g., 1 kilometer) traveled by the missile after launch or an altitude (e.g., 1500 meters) of the missile above the surface of the area. Numerous other configurations will be apparent in light of the present disclosure.

The missile is configured to carry out a second flight path in response to not receiving a signal from a target located at an on-axis position relative to the first flight path of the missile. In more detail, the missile, in some embodiments, is configured to carry out the second flight path in response to not receiving a signal identifying a target within a specified period of time, such as five seconds. In such embodiments, the missile is configured to initiate a timer (e.g., using the processor within the flight control system) to measure the elapsed time during missile travel within the area. In some instances, the timer may begin upon the missile being launched from the launch platform. The timer, in other instances, may include a time delay function, in which the timer begins measuring time at a period of time after launch, such as 30 seconds, to enable the launch platform to leave the space. The missile, in other embodiments, is configured to carry out the second flight path based on the distance traveled by the missile, such as two kilometers. In more detail, the missile is configured to determine a Mach number to identify a velocity of the missile. A Mach number is a ratio of the speed of a body (e.g., the missile) to the speed of sound in the surrounding medium (e.g., air). A Mach number can be estimated in a number of ways, including using inertial navigation systems and global positioning system to measure the velocity of the missile relative to the speed of sound for a missile traveling from a first position to a second position within the area. In addition, the Mach number can also be derived using measurements, such as axial acceleration and absolute pressure, to determine a missile velocity. In any event, the Mach number can be used to determine a distance traveled by the missile over a period of time. The determined distance can be used to carry out the second flight path if no targets are identified during the first flight path of the missile.

Figure 4C:
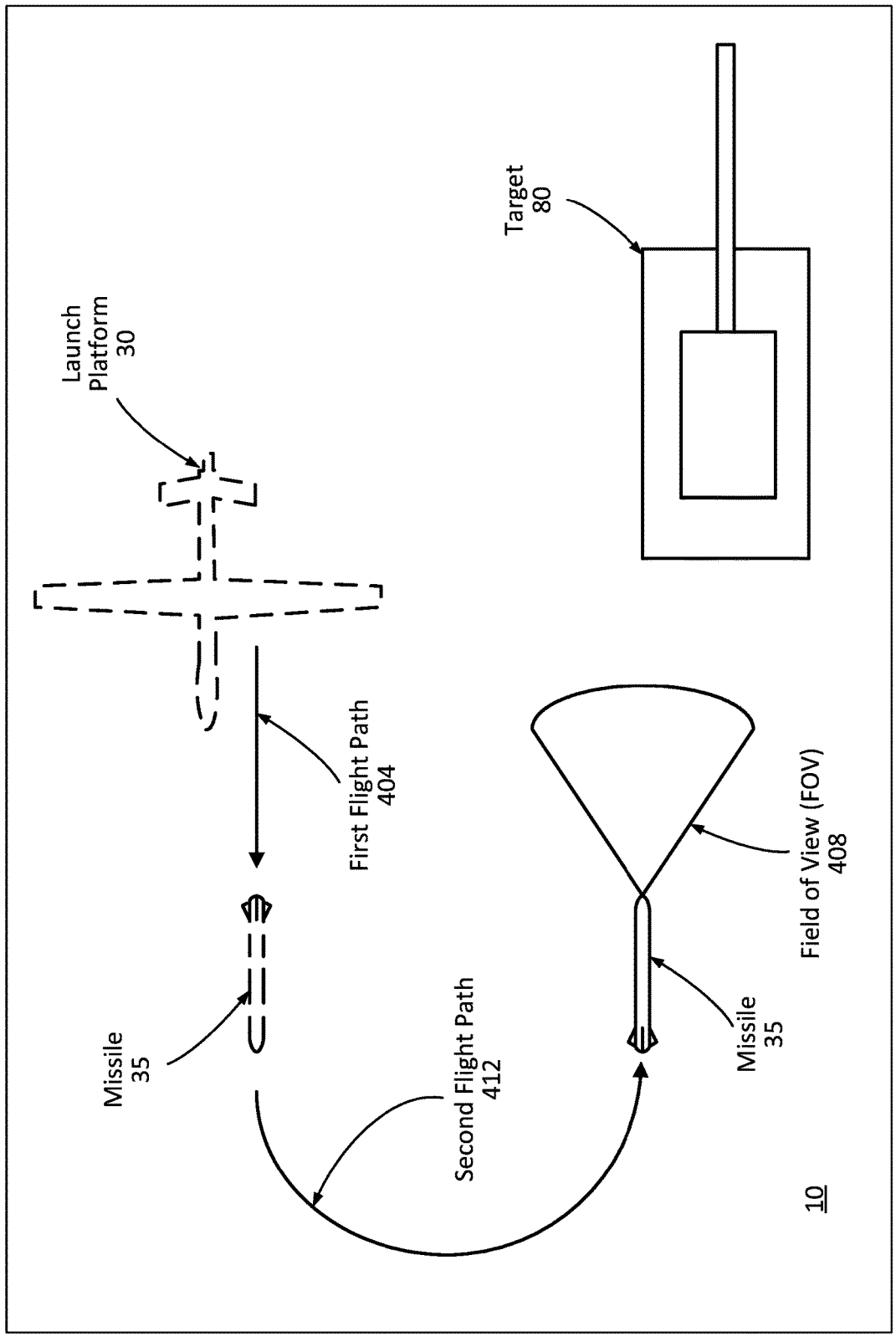
FIG. 4C is a top view of an area illustrating a second flight path for the missile within the area, in accordance with an embodiment of the present disclosure.
Figure 4F:
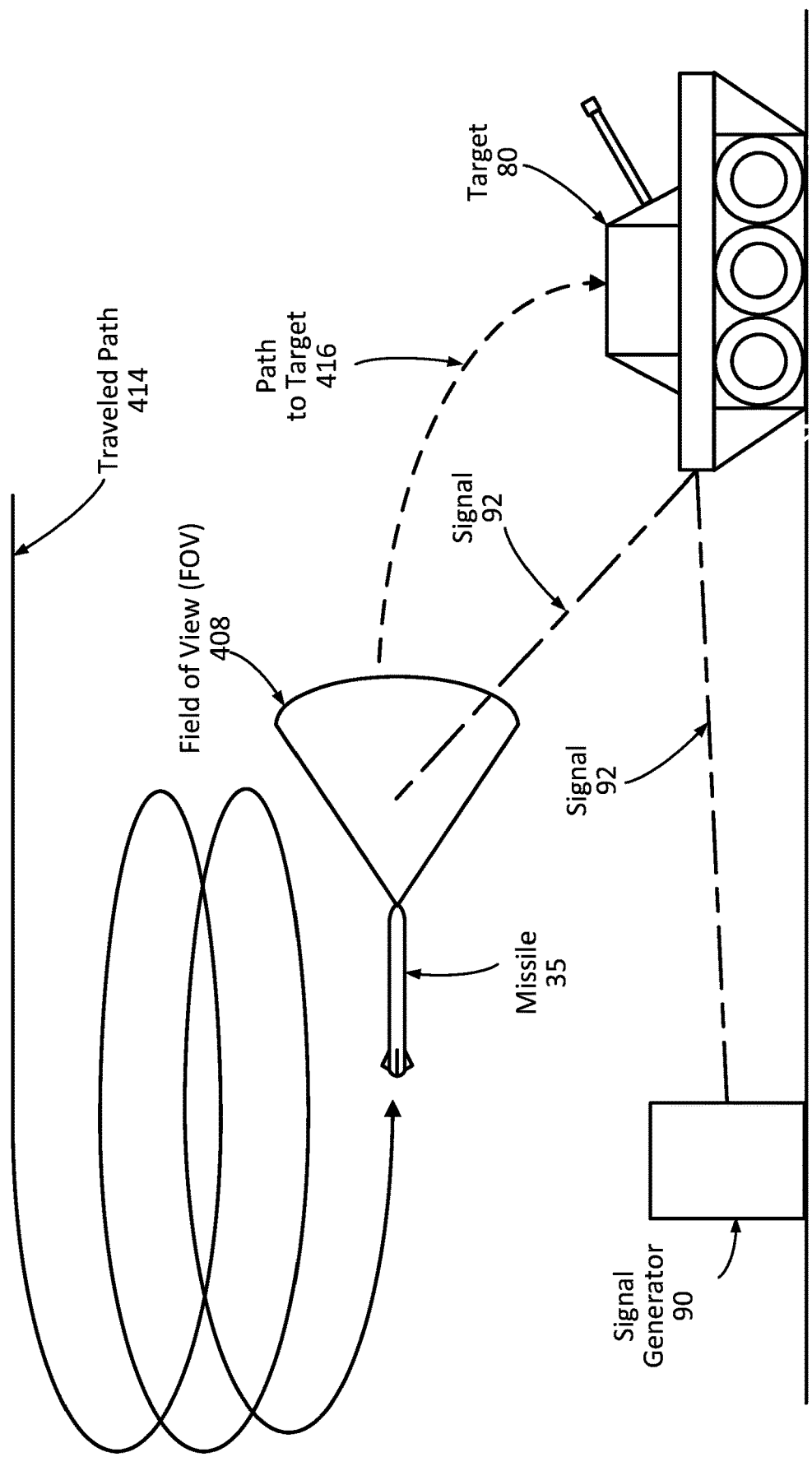
FIG. 4F is a side view of an area illustrating a missile acquiring a target upon traveling a second path, in accordance with an embodiment of the present disclosure.

The method 300 further includes receiving 316 a target signal via the fixed sensor while the missile is on the second path. In an example embodiment, the missile is configured to identify the presence of a target within an area based on receiving a signal reflected from or otherwise corresponding to the target. This is illustrated in FIGS. 4E and 4F, in which the missile 35 moves along a traveled path 414 (e.g., the first flight path 404 and second flight path 412 of FIGS. 4C and 4D) within the area 10 to identify targets, such as target 80. While moving along a second flight path 412 (e.g., a spiral or corkscrew or u-shaped path), the missile 35 is re-positioned within the area 10, such that the signal 92, reflected from the target 80, enters the FOV 408 of the sensor disposed on the missile 35. The sensor, such as a semi-active laser seeker, is configured to identify the presence of the target 80 in response to detecting the reflected signal 92 (e.g., receiving photons from a laser signal) within the FOV 408. The sensor, in some embodiments, further processes the signal 92 to verify or otherwise determine whether the signal 92 corresponds to a target, as previously described. Once verified, the guidance system onboard the missile 35 is configured to initiate instructions and/or commands to the flight control system to adjust the second flight path of the missile 35.

The method 300 further includes adjusting 320 a second flight path of the missile to direct the missile to the target within the area based on the received signal. Once a target is identified, the missile is configured to adjust its flight path (e.g., the second flight path) to engage the target. This is illustrated in FIGS. 4E and 4F, in which the missile 35 while moving along the traveled path 414 (e.g., the first flight path 404 and second flight path 412 of FIGS. 4C and 4D) receives the signal 92 identifying the target 80, and in turn determines a path to target 416. In an example embodiment, the path 416 is a flight path that allows the missile 35 to maintain the received signal 92 within the FOV of the fixed sensor disposed on the missile 35 while the missile moves towards the target 80. Numerous other embodiments will apparent in light of this disclosure.

Further Considerations

Numerous other configurations will be apparent in light of this disclosure. For example, as previously described herein, the missile is configured to carry out a second flight path in response to not receiving a signal from an on-axis target located relative to the first flight path of the missile. The missile, in some embodiments, is configured to carry out the second flight path in a particular direction relative to the first flight path in response to detecting a signal from the launch platform. In more detail, the platform is configured to generate and transmit a signal, such as a laser signal, within the air space about the missile (e.g., to the left or right of the missile), as the missile travels along the first flight path. Particulate within the air space about the missile reflects at least some portion of the signal towards the FOV of the sensor disposed on the missile. This portion of the signal is called backscatter. In response, the missile is configured to detect the reflected signal (the backscatter) and carry out the second flight path in the direction of the detected signal.

In some embodiments, the area about the target in which the guided munition, such as a guided missile, travels through while carrying out the first and second flight paths can be adjusted or otherwise modified to allow the missile to identify and engage the target. The missile, for instance, upon carrying out the first and second flights can be configured to increase or decrease the size of the area (e.g., from 20 square miles to 50 square miles) to detect a signal reflected from a target within the area. In response to adjusting the area, the missile is configured to re-perform or otherwise execute again the first and second flight paths within the adjusted area. In some instances, however, adjustments in the size of the area may be limited based on the factors such as, initial altitude and fuel capacity of the missile. In some other instances, the missile is configured to adjust the area about the target in response to acquiring a target. In such an instance, the missile is configured to adjust the area using the detected signal, such that the identified target is located within the center of the area.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A guided munition system, comprising:
a guided munition deliverable to an area by a launch platform traveling along a pre-programmed route to the area, the guided munition configured to initially travel along a first flight path through the area and to transition to a second flight path through the area in response to not identifying an on-axis target when traveling on the first flight path, the second flight path being different from the first flight path and configured to locate an off-axis target relative to the first flight path; and
a sensor onboard the guided munition, the sensor positioned relative to the guided munition and to detect an input signal indicative of the on-axis target as the guided munition moves along the second flight path;
wherein the guided munition includes a switch, the switch to input a signal identifier into the guided munition to identify signals received by the sensor that correspond to the target.

2. The system of claim 1 further comprising a signal generator to transmit a signal to illuminate the target, such that the signal is reflected from the target and received by the sensor of the guided munition.

3. The system of claim 1, wherein the sensor has a field of view between 30 and 40 degrees.

4. The system of claim 1, wherein the second flight path is a pre-programmed flight path that guides the guided munition through a substantially u-shaped flight path.

5. The system of claim 1, wherein the second flight path is a pre-programmed flight path that guides the guided munition through a spiral or corkscrew flight path.

6. The system of claim 1, further comprising the launch platform, wherein the launch platform is an autonomous unmanned aerial vehicle, the vehicle to move along a pre-programmed route.

7. The system of claim 1, wherein the guided munition is a missile and the sensor onboard the missile is fixed relative to the missile.

8. A method for navigating a missile to a target after the missile has been launched from a launch platform traveling along a pre-programmed route within an area, the method comprising:
   navigating the missile along a first flight path within the area;
   in response to determining the target is off-axis relative to the first flight path, navigating the missile along a second flight path different from the first flight path, the second flight path to position a fixed sensor onboard the missile to view off-axis locations, relative to the first flight path;
   receiving a signal via the fixed sensor while traveling along the second flight path, the signal identifying presence of the target; and
   adjusting the second flight path to direct the missile to the target within the area based on the received signal;
   wherein navigating the missile along the second flight path commences after a separation criteria is achieved, to allow the launch platform to leave the area prior to commencement of the second flight path.

9. The method of claim 8, further comprising identifying the target based on the received signal.

10. The method of claim 9, wherein identifying the target includes comparing a signal identifier of the received signal with target information stored on the missile.

11. The method of claim 8, wherein navigating the missile along the second flight path commences in response to the missile traveling a pre-defined distance through the area along the first flight path without target detection.

12. The method of claim 11, wherein the pre-defined distance is at least two kilometers.

13. The method of claim 8, wherein navigating the missile along the second flight path commences in response to the missile traveling through the area for a pre-defined period of time without target detection.

14. The method of claim 13, wherein the pre-defined period of time is at least five seconds.

15. A computer program product comprising one or more non-transitory machine readable mediums encoding a plurality of instructions that when executed by one or more processors cause a process to be carried out for navigating a missile to a target within an area, the process comprising:
   causing navigation of the missile through a first flight path within the area;
   in response to determining the target is off-axis relative to the first flight path, causing navigation of the missile along a second flight path different from the first flight path, the second flight path to position a fixed sensor onboard the missile to view off-axis locations relative to the first flight path;
   receiving a signal via the fixed sensor while traveling along the second flight path, the signal identifying presence of the target; and
   causing adjustment the second flight path to direct the missile to the target within the area based on the received signal;
   wherein causing navigation of the missile through the second flight path occurs after separation criteria is achieved, to enable the launch platform to leave the area.

16. The computer program product of claim 15, further comprising identifying the target based on the received signal.

17. The computer program product of claim 15, wherein causing navigation of the missile along the second flight path commences in response to the missile traveling through the area along the first flight path for at least one of a pre-defined period of time and a pre-defined distance.

18. The computer program product of claim 15, wherein the second flight path is a pre-programmed flight path that guides the missile through a u-shaped or spiral or corkscrew flight path.

* * * * *